United States Patent
Kim

(10) Patent No.: US 9,778,064 B2
(45) Date of Patent: *Oct. 3, 2017

(54) METHOD FOR PROVIDING TRAFFIC CONDITIONS DATA USING A WIRELESS COMMUNICATIONS DEVICE, AND A NAVIGATION DEVICE IN WHICH THIS METHOD IS EMPLOYED

(71) Applicant: INTELLECTUAL DISCOVERY CO., LTD., Seoul (KR)

(72) Inventor: Jongwon Kim, Seoul (KR)

(73) Assignee: INTELLECTUAL DISCOVERY CO., LTD., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/048,657

(22) Filed: Feb. 19, 2016

(65) Prior Publication Data

US 2016/0169702 A1    Jun. 16, 2016

Related U.S. Application Data

(63) Continuation of application No. 13/002,399, filed as application No. PCT/KR2009/003520 on Jun. 29, 2009, now Pat. No. 9,342,985.

(30) Foreign Application Priority Data

Jul. 3, 2008    (KR) .................. 10-2008-0064359

(51) Int. Cl.
*G06F 19/00*    (2011.01)
*G06G 7/70*    (2006.01)
(Continued)

(52) U.S. Cl.
CPC ..... *G01C 21/3697* (2013.01); *G01C 21/3682* (2013.01); *G01C 21/3694* (2013.01);
(Continued)

(58) Field of Classification Search
CPC . H04L 67/18; H04L 67/306; H04L 29/08657; H04L 51/20; G01C 21/26;
(Continued)

(56) References Cited

U.S. PATENT DOCUMENTS 6,480,783 B1    11/2002    Myr
2003/0083813 A1    5/2003    Park
(Continued)

FOREIGN PATENT DOCUMENTS

| CN | 1677058 | 10/2005 |
|---|---|---|
| EP | 1953726 | 8/2008 |

(Continued)

OTHER PUBLICATIONS

European Search Report, European Application No. 09773699.5, dated Nov. 24, 2011.

*Primary Examiner* — Farzana Huq
(74) *Attorney, Agent, or Firm* — Sughrue Mion, PLLC

(57) ABSTRACT

A traffic condition data providing method using a wireless communication device and a navigation device performing the method are disclosed. The navigation device includes a travelling path displaying unit that searches a travelling path to a destination set by a user and displays the travelling path on map data, a traffic condition data receiving unit that receives traffic condition data from a content managing server through a wireless communication device in response to a request of providing the traffic condition data over the travelling path, and a traffic condition data providing unit that provides the user with the received traffic condition data.

22 Claims, 5 Drawing Sheets

(51) Int. Cl.
*G08G 1/00* (2006.01)
*G08G 1/123* (2006.01)
*G01C 21/34* (2006.01)
*G01C 21/00* (2006.01)
*G01C 21/36* (2006.01)
*G08G 1/0967* (2006.01)
*G08G 1/0969* (2006.01)
*H04W 4/00* (2009.01)
*G08G 1/0968* (2006.01)

(52) U.S. Cl.
CPC ..... *G08G 1/0969* (2013.01); *G08G 1/096716* (2013.01); *G08G 1/096741* (2013.01); *G08G 1/096775* (2013.01); *G08G 1/096827* (2013.01); *H04W 4/008* (2013.01); *G08G 1/096811* (2013.01); *G08G 1/096844* (2013.01); *G08G 1/096883* (2013.01)

(58) Field of Classification Search
CPC ........ G01C 21/32; G01C 21/34; G01C 21/36; G01C 21/3415; G01C 21/3492; G01C 21/3667; G01C 21/3617; G01C 21/3679; G01C 21/3682; G01C 21/3691; G01C 21/3694; G08G 1/00; G08G 1/01; G08G 1/081; G08G 1/091; G08G 1/0104; G08G 1/163; G08G 1/0969; G08G 1/096775; G08G 1/096716; G08G 1/096827; G08G 1/096741; G08G 1/096811; G08G 1/096844; G08G 1/096
USPC ......... 709/200, 225–226, 232, 237; 701/117, 701/177, 200, 201, 208, 213–214; 713/150, 170–171, 182
See application file for complete search history.

(56) References Cited

U.S. PATENT DOCUMENTS

| | | |
|---|---|---|
| 2004/0203909 A1 | 10/2004 | Koster |
| 2004/0239531 A1 | 12/2004 | Adamczyk |
| 2004/0246566 A1 | 12/2004 | Miyamoto et al. |
| 2004/0266401 A1 | 12/2004 | Krishnan |
| 2005/0131643 A1* | 6/2005 | Shaffer .............. G01C 21/3492 701/414 |
| 2006/0031007 A1* | 2/2006 | Agnew .............. G01C 21/3492 701/423 |
| 2006/0247850 A1* | 11/2006 | Cera ...................... G01C 21/32 701/532 |
| 2007/0130153 A1 | 6/2007 | Nachman et al. |
| 2007/0208749 A1 | 9/2007 | Price et al. |
| 2008/0007399 A1 | 1/2008 | Hart |
| 2008/0140305 A1* | 6/2008 | Kim ................. G08G 1/096716 701/117 |
| 2008/0255754 A1* | 10/2008 | Pinto .................. G01C 21/3691 701/119 |
| 2009/0112452 A1* | 4/2009 | Buck ............... G08G 1/096716 701/117 |
| 2009/0319163 A1* | 12/2009 | Sutter .................. G08G 1/0104 701/117 |
| 2009/0322560 A1 | 12/2009 | Tengler et al. |
| 2011/0106426 A1 | 5/2011 | Tertoolen |
| 2011/0112764 A1 | 5/2011 | Trum |
| 2012/0011137 A1 | 1/2012 | Sheha et al. |
| 2012/0059573 A1* | 3/2012 | Nortrup ............. G01C 21/3667 701/118 |

FOREIGN PATENT DOCUMENTS

| | | |
|---|---|---|
| KR | 10-0401158 | 10/2003 |
| KR | 10-2006-0044583 | 5/2006 |
| WO | 01/82261 | 11/2001 |
| WO | 2007/008055 | 1/2007 |

* cited by examiner

METHOD FOR PROVIDING TRAFFIC CONDITIONS DATA USING A WIRELESS COMMUNICATIONS DEVICE, AND A NAVIGATION DEVICE IN WHICH THIS METHOD IS EMPLOYED

CROSS-REFERENCE TO RELATED APPLICATIONS

This is a continuation of application Ser. No. 13/002,399 filed Feb. 18, 2011, which is U.S. National Stage of International Application No. PCT/KR2009/003520 filed Jun. 29, 2009, which claims priority to Korean patent Application No. 10-2008-0064359 filed Jul. 3, 2008, the contents of all of which are incorporated herein by reference in their entirety.

TECHNICAL FIELD

The present invention relates to a traffic condition data providing method using a wireless communication device and a navigation device performing the method, and more specifically to a method and device that may receive traffic condition data from a content managing server through a wireless communication device to allow a user to identify a traffic condition over a travelling path in a real-time animated manner.

BACKGROUND ART

A driver wants to previously know traffic information on a travelling path to arrive at their destination more quickly. In particular, if the destination may be reached through a bypass known based on traffic information acquired in real time in a case where an accident occurs, it is efficient in terms of driving time.

A navigation device may obtain traffic information in real time through TPEG protocol. However, in the case of receiving real-time traffic information through TPEG, it fails to reflect traffic conditions varying fast. Further, real-time traffic information using TPEG differentiates a traffic condition from another, and thus, it is difficult for a driver to identify actual traffic conditions in a specific position.

Therefore, there is a need for a method that may acquire animated information reflecting real-time traffic information through a navigation device while a driver drives, thus providing the driver with convenience.

DISCLOSURE

Technical Problem

The present invention provides a traffic condition data providing method using a wireless communication device and a navigation device performing the method, which may provide a user with more precise and effective traffic information by receiving traffic condition data from a content managing server through a wireless communication device and providing the traffic condition data to the user.

The present invention provides a traffic condition data providing method using a wireless communication device and a navigation device performing the method, which allows a user to identify traffic conditions more efficiently by providing the user with traffic condition data associated with map data considering a user's position.

Technical Solution

The navigation device according to an embodiment of the present invention includes a travelling path displaying unit that searches a travelling path to a destination set by a user and displays the travelling path on map data, a traffic condition data receiving unit that receives traffic condition data from a content managing server through a wireless communication device in response to a request of providing the traffic condition data over the travelling path, and a traffic condition data providing unit that provides the user with the received traffic condition data.

A method of providing traffic condition data through a navigation device according to an embodiment of the present invention comprises searching a travelling path to a destination set by a user and displaying the travelling path on map data, receiving traffic condition data from a content managing server through a wireless communication device in response to a request of providing the traffic condition data over the travelling path, and providing the user with the received traffic condition data.

Advantageous Effects

According to the present invention, a traffic condition data providing method using a wireless communication device and a navigation device performing the method, which may provide a user with more precise and effective traffic information by receiving traffic condition data from a content managing server through a wireless communication device and providing the traffic condition data to the user, are provided.

According to the present invention provides a traffic condition data providing method using a wireless communication device and a navigation device performing the method, which allows a user to identify traffic conditions more efficiently by providing the user with traffic condition data associated with map data considering a user's position, are provided.

BEST MODE

Figure 1:
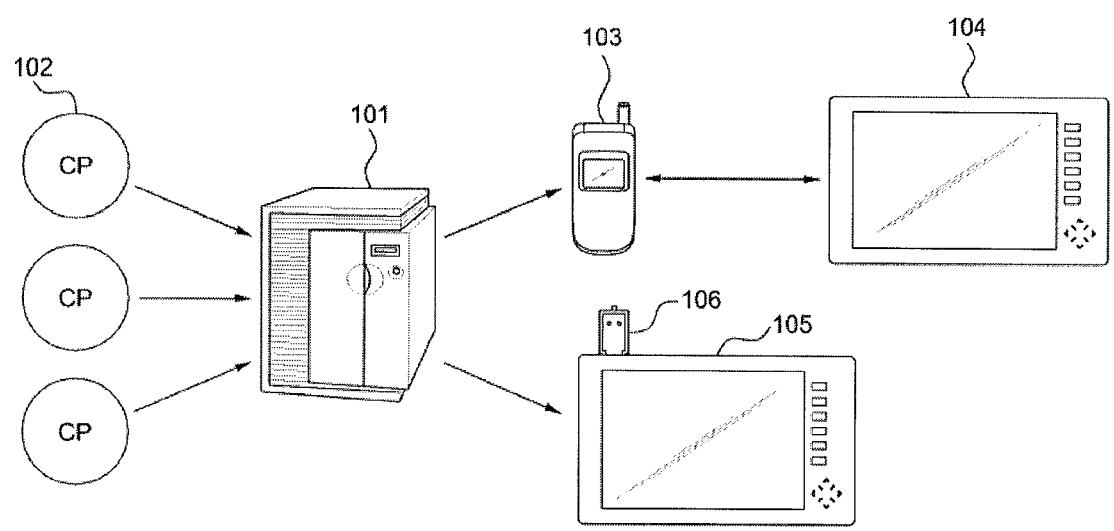
FIG. 1 is a view illustrating an entire process of providing traffic condition data according to an embodiment of the present invention.

Hereinafter, embodiments of the present invention will be described in detail with reference to the accompanying drawings. However, the present invention is not limited to the embodiments. Like reference numerals denote like elements throughout the drawings. A traffic condition data providing method using a wireless communication device and a navigation device performing the method according to an embodiment of the present invention may be performed by a navigation device.

FIG. 1 is a view illustrating an entire process of providing traffic condition data according to an embodiment of the present invention.

The present invention relates to content-based telematics and is characterized that a navigation device receives traffic condition data through a wireless communication device and provides the traffic condition data to a user.

Referring to FIG. 1, a content managing server 101 may collect traffic condition data from a plurality of content providers 102. As an example, the traffic condition data may include CCTV data, variable message sign data, or traffic information data.

The content managing server 101 may transmit the collected traffic condition data to navigation devices 104 and 105. As an example, the navigation device 104 may indirectly receive the traffic condition data from the content managing server 101 using a wireless communication terminal 103. For example, the wireless communication terminal 103 may include various portable terminals, such as a cellular phone, a PCS phone, a PDA phone, etc.

The navigation device 105 may directly receive the traffic condition data from the content managing server 101 using a wireless Internet access device 106. For example, the wireless Internet access device 106 may include a wireless Internet modem related to WIBRO or HSDPA. The wireless communication terminal 103 and the wireless Internet access device 106 are not limited to specific types.

Resultantly, the navigation device 104 or 105 may receive the traffic condition data from the content managing server 101 through the wireless communication terminal 103 or the wireless Internet access device 106.

Figure 2:
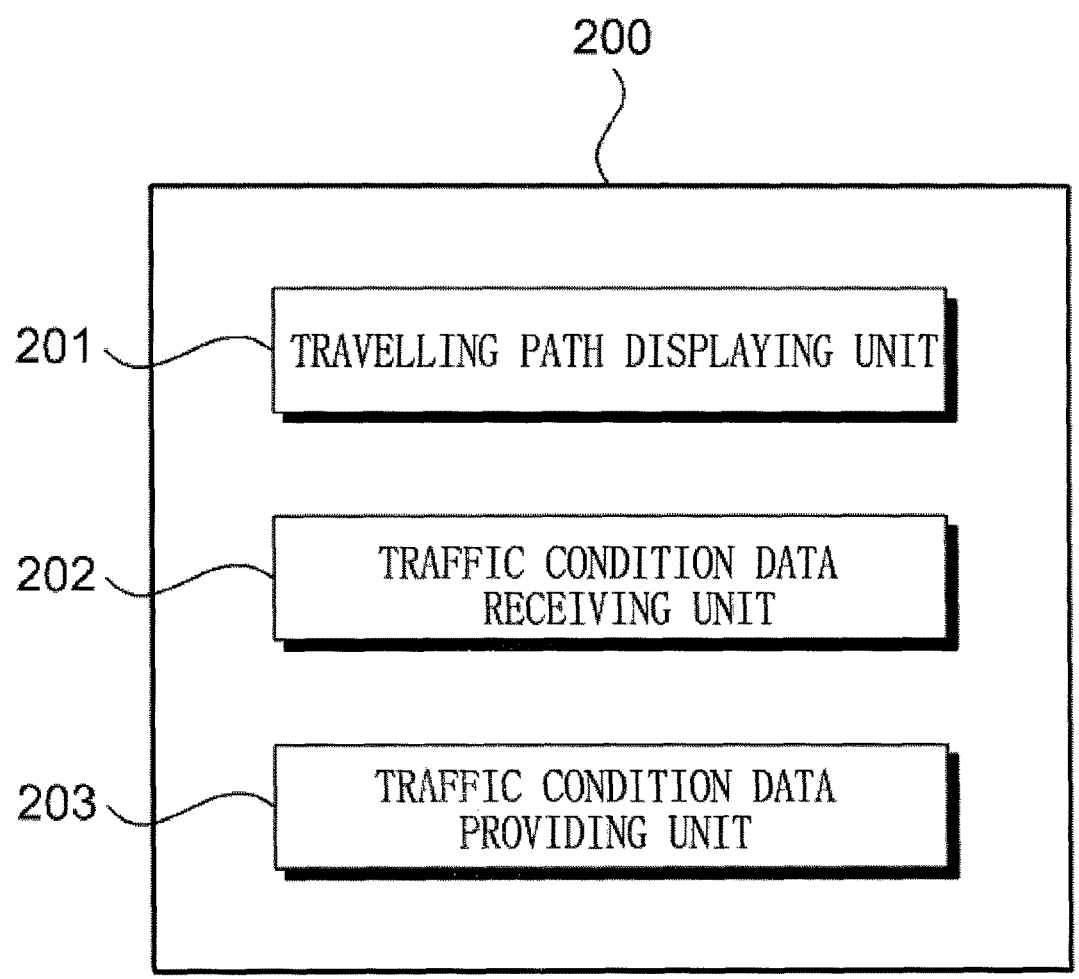
FIG. 2 is a block diagram illustrating an entire construction of a navigation device according to an embodiment of the present invention.

FIG. 2 is a block diagram illustrating an entire construction of a navigation device according to an embodiment of the present invention.

Referring to FIG. 2, a navigation device 200 may include a travelling path displaying unit 201, a traffic condition data receiving unit 202, and a traffic condition data providing unit 203.

The travelling path displaying unit 201 may search a travelling path to a destination set by a user and may display the travelling path on map data. In this case, the user may select a position for receiving the traffic condition data on the travelling path.

The traffic condition data receiving unit 202 may receive the traffic condition data from the content managing server through the wireless communication device in response to a providing request of the traffic condition data on the travelling path. As an example, the traffic condition data may be at least one of traffic information data, CCTV data, or variable message sign data on the traveling path. The traffic information data may be provided in the form of text, and the CCTV data and the variable message sign data may be provided in the form of an image.

At this time, the wireless communication device may be a wireless Internet access device provided in the navigation device 200 or a wireless communication terminal that may perform near field communication with the navigation device 200. For example, in the case that the wireless communication device is a wireless Internet access device, the traffic condition data may be directly received from the content managing server attached to the navigation device 200. And, in the case that the wireless communication device is a wireless communication terminal, the wireless communication terminal may receive the traffic condition data from the content managing server and may transmit the received traffic condition data to the navigation device 200 through near field wireless connection.

At this time, the navigation device 200 may search a wireless communication terminal that may perform near field wireless communication and is located near in response to a traffic condition data providing request from the user. For example, if the user makes the traffic condition data providing request through a display of the navigation device 200, the navigation device 200 may search a wireless communication terminal located near. As an example, the wireless communication terminal may include a terminal, such as a cellular phone or a PDA that supports a WPAN (Wireless Personal Area Network).

At this time, the wireless communication terminal may be a terminal that may perform near field wireless communication with the navigation device 200. For example, the near field wireless communication may include a wireless communication scheme, such as an infrared scheme, a RF (Radio Frequency) scheme, a Bluetooth scheme, a ZigBee scheme, or a UWB (Ultra Wide Band) scheme.

At this time, the navigation device 200 may receive the traffic condition data from a wireless communication terminal identified to subscribe for a service of providing the traffic condition data through terminal authentication with the content managing server. As an example, the terminal authentication of the navigation device 200 may be completed if the navigation device 200 is registered in the content managing server and wireless connection information stored in the navigation device 200 is matched. At this time, whether the navigation device 200 has been registered in the content managing server may be identified using terminal information including at least one of identification data, a terminal model, or a product number of the wireless communication terminal. As an example, the identification data may include an MIN (Mobile Identification Number) and a UUID (Universal Unique Identifier) of the wireless communication terminal. As an example, in a case where the wireless communication terminal and the navigation device 200 are wirelessly connected to each other, the wireless connection information may include an MIN and a Bluetooth address of the wireless communication terminal.

As an example, the traffic condition data receiving unit 202 may analyze points of interest (POIs) over the travelling path and may receive traffic condition data corresponding to the POIs. For example, in a case where there are 10 POIs over a travelling path from A to B, the traffic condition data receiving unit 202 may receive traffic condition data corresponding to the 10 POIs (installation positions of CCTVs or positions of main bridges, main ramps/intersections, or variable message signs, etc.) from the content managing server. In this case, the navigation device 200 may provide the user with a list of the POIs and thus may provide traffic condition data of the POIs desired by the user to the user. At this time, the content managing server may process the traffic condition data based on image setup information including file format, transmission rate, resolution, or frame, and then transmit the processed traffic condition data to the navigation device 200.

The traffic condition data providing unit 203 may provide the received traffic condition data to the user. At this time, the traffic condition data providing unit 203 may provide the traffic condition information in association with map data considering the user's position moving along the travelling path. In a case where the user traveled ½ of a travelling path from X to Y, the navigation device 200 may provide the user with traffic condition data corresponding to the remaining ½ travelling path.

Figure 3:
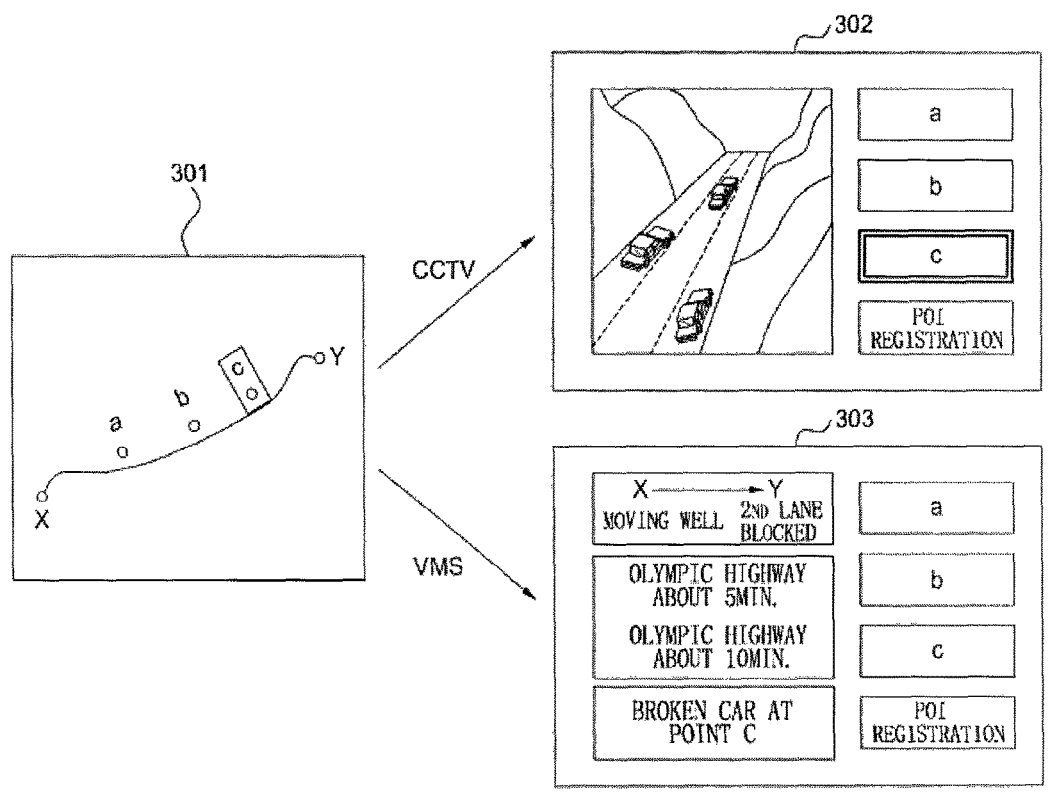
FIG. 3 is a view illustrating an example of providing CCTV data and variable message sign data over a travelling path according to an embodiment of the present invention.

FIG. 3 is a view illustrating an example of providing CCTV data and variable message sign data over a travelling path according to an embodiment of the present invention. Referring to FIG. 3, a travelling path screen 301, a CCTV image screen 302, and a variable message sign screen 303 are illustrated.

In a case where the user selects X as a starting point and Y as a destination, POIs a, b, and c may be included over a travelling path from X to Y. At this time, the POIs may correspond to installation positions of CCTVs or positions of main bridges, main ramps/intersections, or variable message signs.

In a case where the user requests the CCTV image screen 302, the navigation device 200 may provide CCTV moving pictures for the POIs to the user through the CCTV image screen 302. The method or type of providing the CCTV moving pictures is not limited to that shown in FIG. 3, and may vary depending on the navigation device. For example, in a case where the user travels from X to Y, CCTV moving pictures corresponding to POIs a, b, and c may be sequentially or simultaneously provided.

And, in a case where the user requests the variable message sign screen 303, the navigation device 200 may provide the user with variable message sign moving pictures of the POIs through the variable message sign screen 303. The method or type of providing the variable message sign moving pictures is not limited to that shown in FIG. 3, and may vary depending on the navigation device. For example, in a case where the user travels from X to Y, variable message sign moving pictures corresponding to POIs a, b, and c may be sequentially or simultaneously provided.

Besides, the navigation device 200 may provide the user with the traffic information of the POIs in the form of text. For example, the navigation device 200 may provide the user with accident information, average speed information, traffic control information within the POIs in the form of text.

Figure 4:
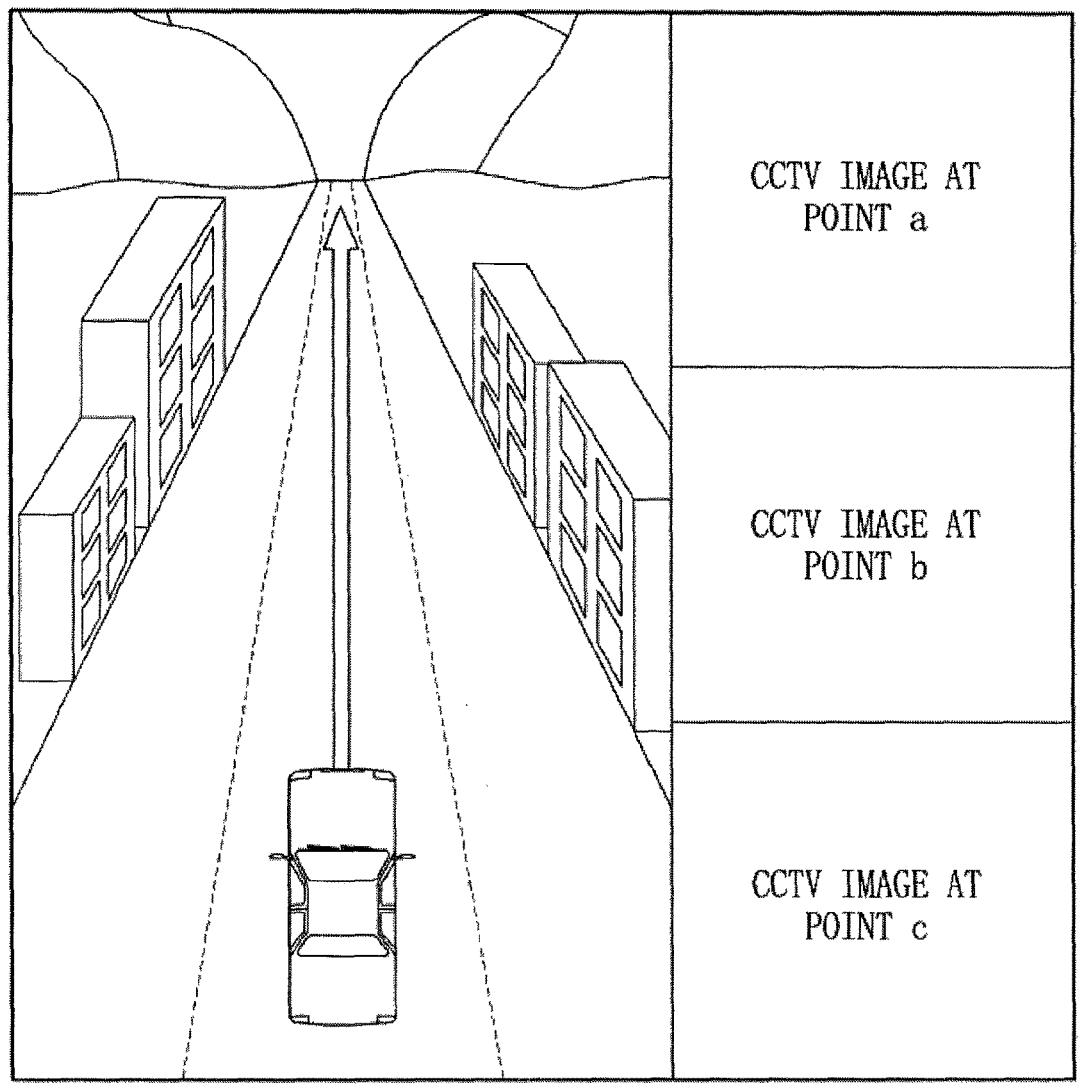
FIG. 4 is a view illustrating an example of providing a CCTV image on a map representing a travelling path according to an embodiment of the present invention.

FIG. 4 is a view illustrating an example of providing a CCTV image on a map representing a travelling path according to an embodiment of the present invention. FIG. 4 illustrates that a user travels along a travelling path over map data.

As an example, the navigation device 200 may provide a user with traffic condition data associated with the map data considering a user's position moving along the travelling path.

At this time, it is assumed that the travelling path includes X and Y as a starting point and a destination, respectively, and POIs a, b, and c are included within the travelling path. Then, the navigation device 200 may provide the user with CCTV images corresponding to POIs a, b, and c in association with the map data. At this time, the CCTV images may be on/off depending on user's authorization. And, the CCTV images may be replaced by variable message sign images. Likewise, the CCTV images may be replaced by text-type traffic information. At this time, the CCTV images or variable message sign images may be images obtained by processing raw images collected by the content managing server to be suitable for the navigation device 200.

When recognizing that there is traffic congestion or traffic control at point c through the CCTV images or variable message sign images, the user may reach the destination through a bypass instead of passing through point c, thus increasing time efficiency.

Figure 5:
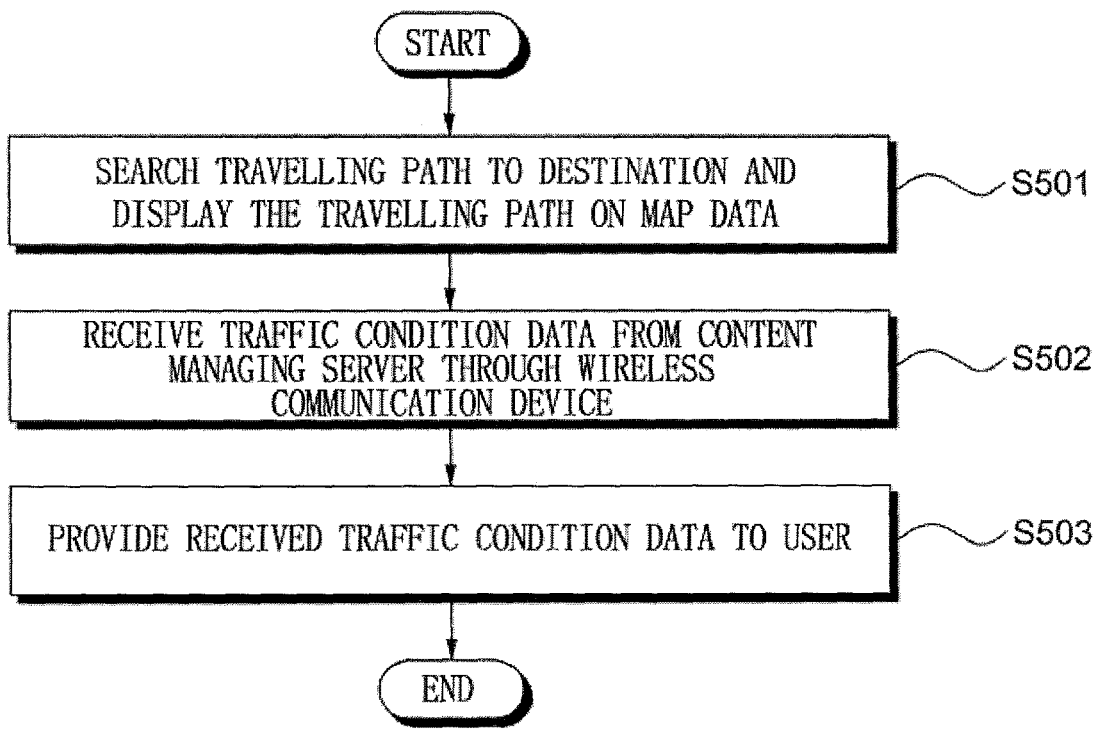
FIG. 5 is a flowchart illustrating a method of providing traffic condition data providing method through a wireless communication device according to an embodiment of the present invention.

FIG. 5 is a flowchart illustrating a method of providing traffic condition data providing method through a wireless communication device according to an embodiment of the present invention.

In step S501, the navigation device 200 may search a travelling path to a destination set by a user and may display the travelling path over map data.

In step S502, the navigation device 200 may receive traffic condition data from the content managing server through the wireless communication device in response to a request of providing traffic condition data on the travelling path.

At this time, the wireless communication device may include a wireless Internet access device provided in the navigation device 200 or a wireless communication terminal that may perform near field wireless communication with the navigation device 200. As an example, the wireless communication terminal means a terminal in which it is identified whether the wireless communication terminal is subscribing for a service of providing the traffic condition data through terminal authentication with the content managing server. At this time, authentication of the wireless communication terminal may be completed when the wireless communication terminal is a terminal registered in the content managing server and matches wireless connection information stored in the navigation device 200.

In step S502, the navigation device 200 may analyze POIs over the travelling path and may receive traffic condition data corresponding to the POIs. At this time, the traffic condition data may be at least one of traffic information data, CCTV data, or variable message sign data over the travelling path.

And, the content managing server may process the traffic condition data depending on image setup information including file format, transmission rate, resolution, or frame.

In step S503, the navigation device 200 may provide the user with the traffic condition data received from the content managing server. At this time, the navigation device 200 may provide the user with the traffic condition data associated with map data considering user's position moving along the travelling path.

Descriptions given in connection with FIGS. 1 to 4 may be referred to for what was not described in FIGS. 6 and 7.

The method of providing a content using a wireless communication device according to an embodiment of the present invention includes a computer readable medium including a program command for performing operations implemented by a computer. The computer readable medium may include a program command, a data file, and a data structure alone or in a combination thereof. The medium or the program command may be one specially designed or constructed for the present invention or one known to one of ordinary skill in the computer software art. Examples of the computer readable recording medium may include magnetic media, such as hard disks, floppy disks, or magnetic tapes, magneto-optical media, such as CD-ROMs or DVDs, and hardware devices, such as ROMs, RAMs, or flash memories, which are specially constructed for storing and executing the program command. Examples of the program command may include machine language codes made by compiler or high class language codes executable by computer using an interpreter.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

The invention claimed is:

1. A navigation device comprising:
a memory comprising computer executable instructions;
a display; and
a processor configured to read and execute the computer executable instructions to implement:
a travelling path displaying unit that searches a travelling path to a destination set by a user and displays, on the display, the travelling path on map data;
a traffic condition data receiving unit that receives traffic condition data for points of interest along the travelling path, including a first point of interest corresponding to a first closed circuit television (CCTV) installation position and a second point of interest corresponding to a second CCTV installation position, through a wireless communication device in response to a request to provide the traffic condition data over the travelling path; and
a traffic condition data providing unit that provides, on the display, the traffic condition data including a first CCTV image corresponding to the first point of interest and a second CCTV image corresponding to the second point of interest,
wherein the travelling path on map data, the first CCTV image, and the second CCTV image are simultaneously provided on the display, and
wherein the traffic condition data for one of the points of interest includes a real-time image of a variable message electric sign positioned at the one of the points of interest, and the traffic condition data providing unit provides, on the display, the real-time image of the variable message electric sign positioned at the one of the points of interest.

2. The navigation device of claim 1, wherein the wireless communication device is a wireless communication terminal for engaging in near-field wireless communication with the navigation device.

3. The navigation device of claim 1, wherein the traffic condition data providing unit provides, on the display, the traffic condition data based at least in part on a user's position and movement along the travelling path.

4. The navigation device of claim 1, wherein the traffic condition data providing unit provides, simultaneously on the display, the first CCTV image, the second CCTV image, and third traffic condition data corresponding to a third point of interest.

5. The navigation device of claim 1, wherein the traffic condition data for one of the points of interest is a real-time image of traffic at the one of the points of interest and the traffic condition data providing unit provides, on the display, the real-time image of traffic at the one of the points of interest.

6. A navigation device comprising:
a memory comprising computer executable instructions;
a display; and
a processor configured to read and execute the computer executable instructions to implement:
a travelling path displaying unit that searches a travelling path to a destination set by a user and displays, on the display, the travelling path on map data;
a traffic condition data receiving unit that receives traffic condition data from a content managing server through a wireless communication device in response to a request to provide the traffic condition data over the travelling path; and
a traffic condition data providing unit that provides, simultaneously on the display, traffic condition data for points of interest along the travelling path including both a first real-time image of closed circuit television (CCTV) data at a first point of interest corresponding to a first CCTV installation position along the travelling path and a second real-time image of CCTV data at a second point of interest corresponding to a second CCTV installation position along the travelling path,
wherein the traffic condition data for the points of interest includes a real-time image of a variable message electric sign positioned at one of the points of interest, and the traffic condition data providing unit provides, on the display, the real-time image of the variable message electric sign positioned at the one of the points of interest.

7. The navigation device of claim 6, wherein the wireless communication device is a wireless communication terminal for engaging in near-field wireless communication with the navigation device.

8. The navigation device of claim 6, wherein the traffic condition data providing unit provides, on the display, the traffic condition data based at least in part on a user's position and movement along the travelling path.

9. The navigation device of claim 6, wherein the traffic condition data providing unit provides, simultaneously on the display, the first real-time image, the second real-time image, and traffic condition data corresponding to a third point of interest.

10. The navigation device of claim 9, wherein the traffic condition data for the third point of interest is a real-time image of a variable message sign positioned at the third point of interest, and the traffic condition data providing unit provides, on the display, the real-time image of the variable message sign positioned at the third point of interest.

11. A navigation device comprising:
a memory comprising computer executable instructions;
a display; and
a processor configured to read and execute the computer executable instructions to implement:
a travelling path displaying unit that searches a travelling path to a destination set by a user and displays, on the display, the travelling path on map data;
a traffic condition data receiving unit that receives traffic condition data for points of interest along the travelling path, including a first point of interest corresponding to a closed circuit television (CCTV) installation position and a second point of interest corresponding to a position of a variable message electric sign, from a content managing server through a wireless communication device in response to a request to provide the traffic condition data over the travelling path; and
a traffic condition data providing unit that provides, on the display, the travelling path on map data, a first CCTV image corresponding to the first point of interest, and an image corresponding to the second point of interest, simultaneously,
wherein the traffic condition data includes a real-time image of traffic at the first point of interest and a real-time image of the variable message electric sign positioned at the second point of interest.

12. The navigation device of claim 11, wherein the wireless communication device is a wireless communication terminal for engaging in near-field wireless communication with the navigation device.

13. The navigation device of claim 11, wherein the traffic condition data providing unit provides, sequentially on the display, the real-time image of traffic at the first point of interest and the real-time image of the variable message display positioned at the second point of interest based at least in part on a user's position and movement along the travelling path.

14. The navigation device of claim 11, wherein the traffic condition data providing unit provides, simultaneously on the display, both the first real-time image of traffic at the first point of interest and the real-time image of the variable message display positioned at the second point of interest.

15. The navigation device of claim 11, wherein the provided real-time image of the variable message electric sign positioned at the second point of interest comprises a real-time image of the variable message electric sign while the variable message sign displays a message of accident information, average speed information, or traffic control information.

16. A method of providing traffic condition data through a navigation device having a display, said method comprising:
    searching a travelling path to a destination set by a user;
    displaying, on the display, the travelling path on map data;
    receiving traffic condition data for points of interest along the travelling path, including a first point of interest corresponding to a first closed circuit television (CCTV) installation position and a second point of interest corresponding to a second CCTV installation position, from a content managing server through a wireless communication device in response to a request to provide the traffic condition data over the travelling path; and
    providing, simultaneously on the display, the traffic condition data including a first real-time image of CCTV data at the first point of interest and a second real-time image of CCTV data at the second point of interest,
    wherein the traffic condition data for the points of interest includes a real-time image of a variable message electric sign positioned at one of the points of interest.

17. The method of claim 16, wherein the wireless communication device is a wireless communication terminal for engaging in near-field wireless communication with the navigation device.

18. The method of claim 16, wherein the providing the traffic condition data is based at least in part on a user's position and movement along the travelling path.

19. The method of claim 16, wherein the providing the traffic condition data further includes providing, simultaneously on the display, the first real-time image, the second real-time image, and traffic condition information corresponding to a third point of interest.

20. A method of providing traffic condition data through a navigation device having a display, said method comprising:
    searching a travelling path to a destination set by a user;
    displaying, on the display, the travelling path on map data;
    receiving traffic condition data for points of interest along the travelling path, including a first point of interest corresponding to a closed circuit television (CCTV) installation position and a second point of interest corresponding to a position of a variable message electric sign, from a content managing server through a wireless communication device in response to a request to provide the traffic condition data over the travelling path; and
    providing, on the display and based at least in part on a user's position and movement along the travelling path, the traveling path on map data and a CCTV image corresponding to the first point of interest simultaneously,
    wherein the traffic condition data includes a real-time image of traffic at the first point of interest and a real-time image of a the variable message electric sign positioned at the second point of interest.

21. The method of claim 20, wherein the wireless communication device is a wireless communication terminal for engaging in near-field wireless communication with the navigation device.

22. The method of claim 20, wherein the provided real-time image of the variable message electric sign positioned at the second point of interest comprises a real-time image of the variable message sign while the variable message electric sign displays a message of accident information, average speed information, or traffic control information.

* * * * *